United States Patent
Wu et al.

(10) Patent No.: US 11,880,964 B2
(45) Date of Patent: Jan. 23, 2024

(54) LIGHT FIELD BASED REFLECTION REMOVAL

(71) Applicant: SHANGHAITECH UNIVERSITY, Shanghai (CN)

(72) Inventors: Minye Wu, Shanghai (CN); Zhiru Shi, Shanghai (CN); Jingyi Yu, Shanghai (CN)

(73) Assignee: SHANGHAITECH UNIVERSITY, Shanghai (CN)

(*) Notice: Subject to any disclaimer, the term of this patent is extended or adjusted under 35 U.S.C. 154(b) by 673 days.

(21) Appl. No.: 17/074,123

(22) Filed: Oct. 19, 2020

(65) Prior Publication Data

US 2021/0082096 A1 Mar. 18, 2021

Related U.S. Application Data

(63) Continuation of application No. PCT/CN2019/083474, filed on Apr. 19, 2019, and a
(Continued)

(30) Foreign Application Priority Data

Apr. 19, 2018 (WO) ................ PCT/CN2018/083783

(51) Int. Cl.
*H04N 5/225* (2006.01)
*G06T 5/50* (2006.01)
(Continued)

(52) U.S. Cl.
CPC ............... *G06T 5/50* (2013.01); *G06T 7/557* (2017.01); *G06T 7/596* (2017.01); *G06T 2200/21* (2013.01); *G06T 2207/10052* (2013.01)

(58) Field of Classification Search
CPC ..................... G06T 7/557; G06T 2207/10052
See application file for complete search history.

(56) References Cited

U.S. PATENT DOCUMENTS

2017/0345143 A1 11/2017 Codella et al.

FOREIGN PATENT DOCUMENTS

| CN | 104809695 A | 7/2015 |
| CN | 106127696 A | 11/2016 |
| CN | 107818552 A | 3/2018 |

OTHER PUBLICATIONS

Liu et al., "Learning to See Through Obstructions With Layered Decomposition", Nov. 1, 2022, IEEE Transactions on Pattern Analysis and Machine Intelligence (vol. 44, Issue: 11, pp. 8387-8402) (Year: 2022).*

(Continued)

*Primary Examiner* — Gary C Vieaux
(74) *Attorney, Agent, or Firm* — Bayramoglu Law Offices LLC

(57) ABSTRACT

A method of processing light field images for separating a transmitted layer from a reflection layer. The method comprises capturing a plurality of views at a plurality of viewpoints with different polarization angles; obtaining an initial disparity estimation for a first view using SIFT-flow, and warping the first view to a reference view; optimizing an objective function comprising a transmitted layer and a secondary layer using an Augmented Lagrange Multiplier (ALM) with Alternating Direction Minimizing (ADM) strategy; updating the disparity estimation for the first view; repeating the steps of optimizing the objective function and updating the disparity estimation until the change in the objective function between two consecutive iterations is below a threshold; and separating the transmitted layer and the secondary layer using the disparity estimation for the first view.

8 Claims, 3 Drawing Sheets

Related U.S. Application Data continuation of application No. PCT/CN2018/083783, filed on Apr. 19, 2018, now abandoned.

(51) Int. Cl.
 *G06T 7/593* (2017.01)
 *G06T 7/557* (2017.01)

(56) References Cited

OTHER PUBLICATIONS

PCT International Search Report and the Written Opinion dated Jul. 17, 2019, issued in related International Application No. PCT/CN2019/083474 (7 pages).

Yu Li et al., "Exploiting Reflection Change for Automatic Reflection Removal", 2013 IEEE International Conference on Computer Vision, Dec. 8, 2013, pp. 2432-2439.

Xiaojie Guo et al., "Robust Separation of Reflection from Multiple Images", 2014 IEEE Conference on Computer Vision and Pattern Recognition, Jun. 23, 2014, pp. 2195-2199.

\* cited by examiner

LIGHT FIELD BASED REFLECTION REMOVAL

CROSS-REFERENCE TO RELATED APPLICATIONS

This application is a continuation application of International Patent Application No. PCT/CN2019/083474, filed on Apr. 19, 2019, which is based on and claims the benefit of priority to International Application under Patent Cooperation Treaty, No. PCT/CN2018/083783, filed on Apr. 19, 2018. The above-referenced applications are incorporated herein by their entirety.

TECHNICAL FIELD

The present invention relates to image processing, and more particularly, to a method of light field based image processing.

BACKGROUND

A scene of interest is often placed behind a reflection or transparent layer. Typical examples include a picture behind a glass cover and a scene blocked by a sheer curtain. In such situations, the images can be generally modeled as a linear combination of the transmitted layer containing the scene of interest and the secondary layer containing the reflection or transparency. The images can be captured using light field cameras, and the inputs are light field images from different viewpoints, wherein the central view is often used as the reference view.

To get a more accurate image of the scene, it is often desirable to separate the transmitted layer from the reflection or transparent layer. One of the approaches is to apply polarizers to the cameras in the light field with different polarization angles. Most of light in the real life is unpolarized, and upon being reflected by an interface, the light will have different polarization than that of the transmitted light. Capturing a different part of the reflection can be useful in separating the transmitted layer.

One approach to separate the layers for the reference view is by exploring redundant information that is available from the other views. To account for scene appearance in all the views, the disparity map of the transmitted layer is estimated; this map is used to align all the light field views with respect to the reference to facilitate layer separation. The disparity map estimation and layer separation steps are done iteratively. In the prior art technology, the separation quality heavily relies on flow initialization. As a result, the overall quality of layer separation is not optimized since the initial disparity estimation can be erroneous.

Therefore, there is a need for techniques to improve the overall quality of layer separation.

SUMMARY

To address issues in the prior art, embodiments of the present invention provide a method of processing light field images for separating a transmitted layer from a reflection layer.

In accordance with an embodiment of the present invention, the method comprises capturing a plurality of views at a plurality of viewpoints with different polarization angles; obtaining an initial disparity estimation for a first view using SIFT-flow, and warping the first view to a reference view; optimizing an objective function comprising a transmitted layer and a secondary layer using an Augmented Lagrange Multiplier (ALM) with Alternating Direction Minimizing (ADM) strategy; updating the disparity estimation for the first view; repeating the steps of optimizing the objective function and updating the disparity estimation until the change in the objective function between two consecutive iterations is below a threshold; and separating the transmitted layer and the secondary layer using the disparity estimation for the first view.

Preferably, the transmitted layer is of low rank.

Preferably, the secondary layer is sparse.

Preferably, the transmitted layer and the secondary layer are independent.

Preferably, gradients of the transmitted layer and the secondary layer are sparse.

Preferably, the method further comprises calculating a perfect polarization angle for the reference view.

Preferably, the method further comprises setting the perfect polarization angle as the polarization angle for the reference view.

Preferably, the plurality of views are part of a light field video.

BRIEF DESCRIPTION OF THE DRAWINGS

To better illustrate the technical features of the embodiments of the present invention, various embodiments of the present invention will be briefly described in conjunction with the accompanying drawings.

DETAIL DESCRIPTION OF THE EMBODIMENTS

In accordance with embodiment of the present invention, a method of processing light field images for separating a transmitted layer from a reflection layer is provided.

In accordance with embodiments of the present invention, the light field of the scene (transmitted layer) with a secondary layer (e.g., reflection) is captured. The inputs are light field images from different viewpoints, and the central view is used as the reference view.

For each camera in the light field, polarizers are applied to the cameras with different polarization angles. Most of light in the real life is unpolarized, and upon being reflected by an interface, the light will have different polarization than that of the transmitted light. Different part of the reflection can be captured, which are useful to separate the transmitted layer.

One approach to separate the layers for the reference view is by exploring redundant information that is available from the other views. To account for scene appearance in all the views, the disparity map of the transmitted layer is estimated; this map is used to align all the light field views with respect to the reference to facilitate layer separation. The disparity map estimation and layer separation steps are done iteratively.

More constraints are introduced to facilitate the finding of an optimal solution. First, the transmitted layer should be the same after disparity warping to the reference view, and therefore should be of low rank. In contrast, the warped secondary layer should have pixel-wise low coherence across views, because they are warped by using the disparity of the transmitted layer rather than their own disparity map, and therefore the secondary layer should be sparse. In addition, the transmitted and secondary layers should be independent and their gradients are sparse.

Figure 1:
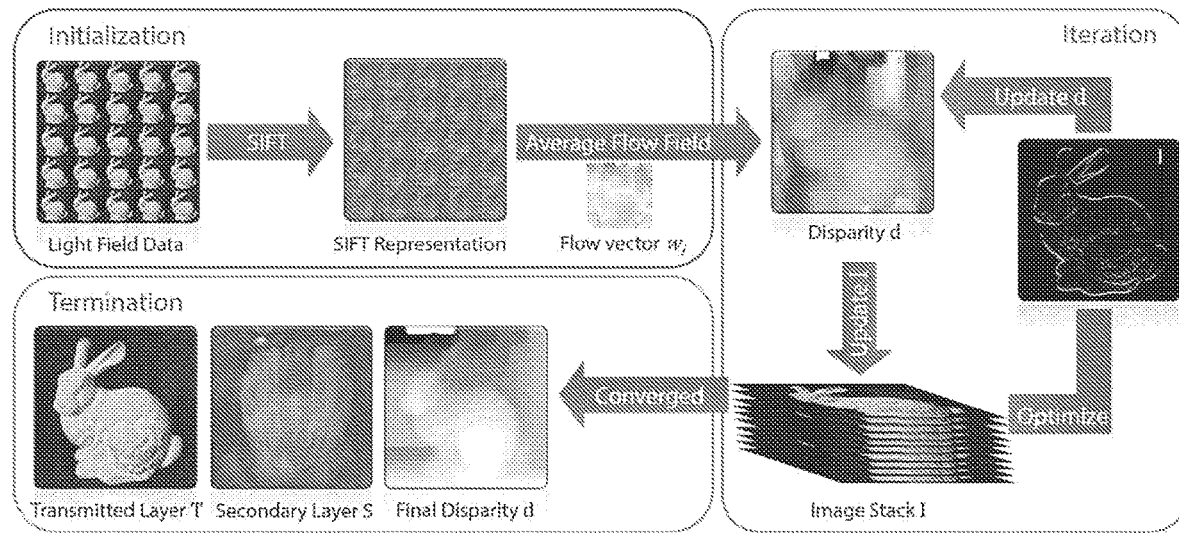
FIG. 1 is an exemplary schematic diagram for a method of processing light field images for separating a transmitted layer from a reflection layer in accordance with an embodiment of the present invention.

FIG. 1 is an exemplary schematic diagram for a method of processing light field images for separating a transmitted layer from a reflection layer in accordance with an embodiment of the present invention. As shown in FIG. 1, the method includes the following steps:

1. Capture the light field data with K=N×N viewpoints. The center view will be used as the reference view.
2. For each view other than the center view, run SIFT-flow to obtain the initial disparity estimation, and warp this view to the center view.
3. Use Augmented Lagrange Multiplier (ALM) with Alternating Direction Minimizing (ADM) strategy to optimize the objective function. The objective function is a function combined with the transmitted layer T, the secondary layer S (commonly the reflection layer) and the disparity d. The goal is to resolve T and S by minimalize the value of this function like a convex optimization problem. Adopt the alternating direction method to iteratively solve the subproblems.
4. Once the solutions at each iteration are obtained, update the disparity estimation, and warp the view to the center view by using the new disparity.
5. Repeat steps 3 and 4 until the change of the objective function between two consecutive iterations is very small, such as below a certain threshold. In one embodiment, the threshold is 0.1.
6. Separate the transmitted layer and secondary layer by using the final disparity. Actually, after we get T and S in step 3, the transmitted layer and the secondary layer are separated. However, as explained in step 3, the objective is related to disparity d, so the quality of separation depends on the accuracy of disparity d. Unfortunately, the initial disparity is not often good enough, and therefore it is often necessary to perform step 5 to optimize the disparity.

In accordance with one embodiment of the present invention, the method starts by warping the sub-aperture images to the center view. As the transmitted layer is unlikely to be planar, a dense 3D reconstruction would be needed for warping the images. To avoid significant errors, SIFT-flow is used to obtain the initial disparity estimation by averaging local flows.

After the initial disparity estimation is obtained, Augmented Lagrange Multiplier (ALM) with Alternating Direction Minimizing (ADM) strategy is used to optimize the objective function. The goal of ALM is to find a saddle point of L, which approximates the solution of the original problem. The alternating direction method is adopted to iteratively solve the subproblems. Once the solutions at each iteration are obtained, the disparity estimation is updated. This process is then repeated, and terminates when the change of the objective function between two consecutive iterations is very small. In one embodiment, it is below 0.1.

Figure 2:
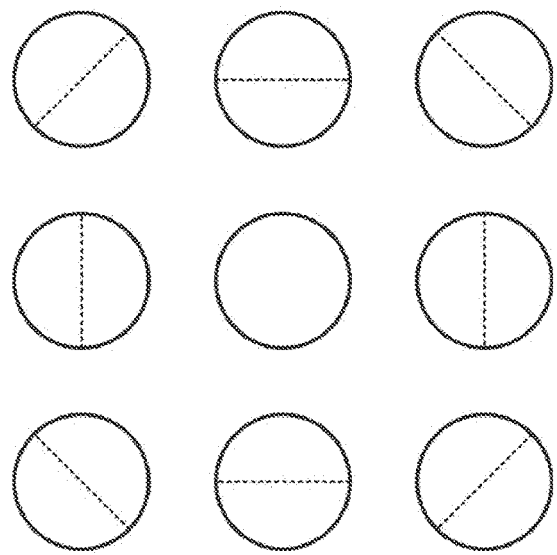
FIG. 2 is an exemplary schematic diagram showing the polarization angles of the polarizers applied to the light field cameras in accordance with another embodiment of the present invention.

In the above discussion, it is assumed that that the transmitted layer is dominant. When polarizers are applied to the light field cameras, the reflections will be reduced differently based on the polarization angles, and the algorithm above will work better. The remaining problem is to determine such angles, since cameras at different positions may receive reflections with different polarization directions. FIG. 2 is an exemplary schematic diagram showing the polarization angles of the polarizers applied to the light field cameras in accordance with another embodiment of the present invention. As the center camera should be the reference, we first set the outer 8 cameras with the pattern shown in FIG. 2, and with these, we can calculate a perfect angle which can reduce most reflections at the center viewpoint, and we set the center camera with the perfect angle.

Results

1. Warping

Figure 3:
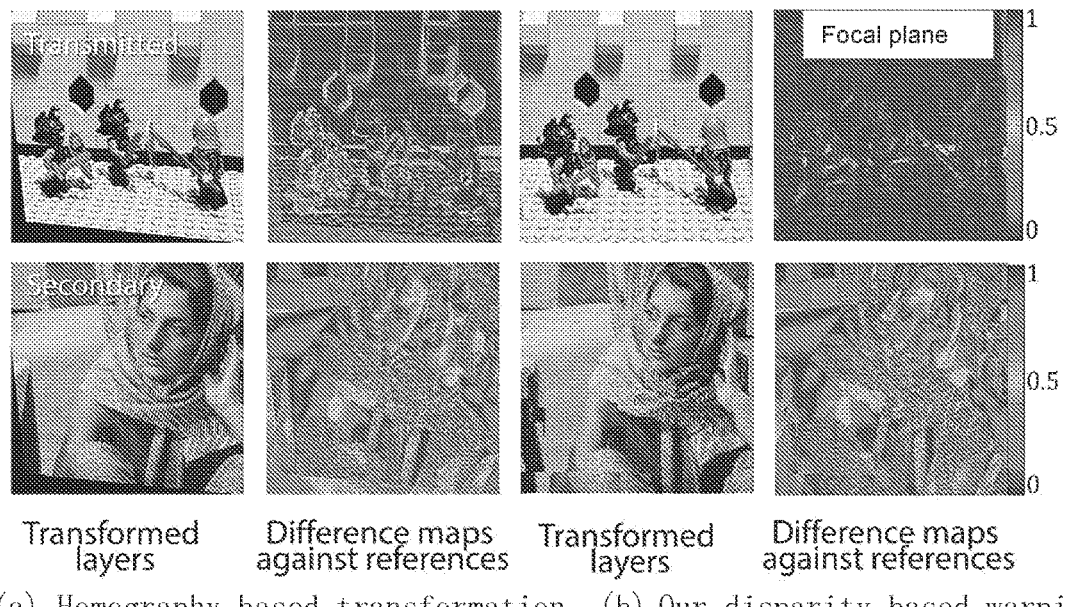
FIG. 3 shows the images of the transmitted layer and the secondary layer using homography based transformation and disparity map based warping in accordance with yet another embodiment of the present invention.

We first compare our disparity based warping with homography based transformation. FIG. 3 shows the images of the transmitted layer and the secondary layer using homography based transformation and disparity map based warping in accordance with yet another embodiment of the present invention. As shown in FIG. 3, disparity map produces more consistency than homography on the transmitted layer. Both transformations produce high incoherence on the secondary layer.

2. Comparison with Prior Art Techniques.

Figure 4:
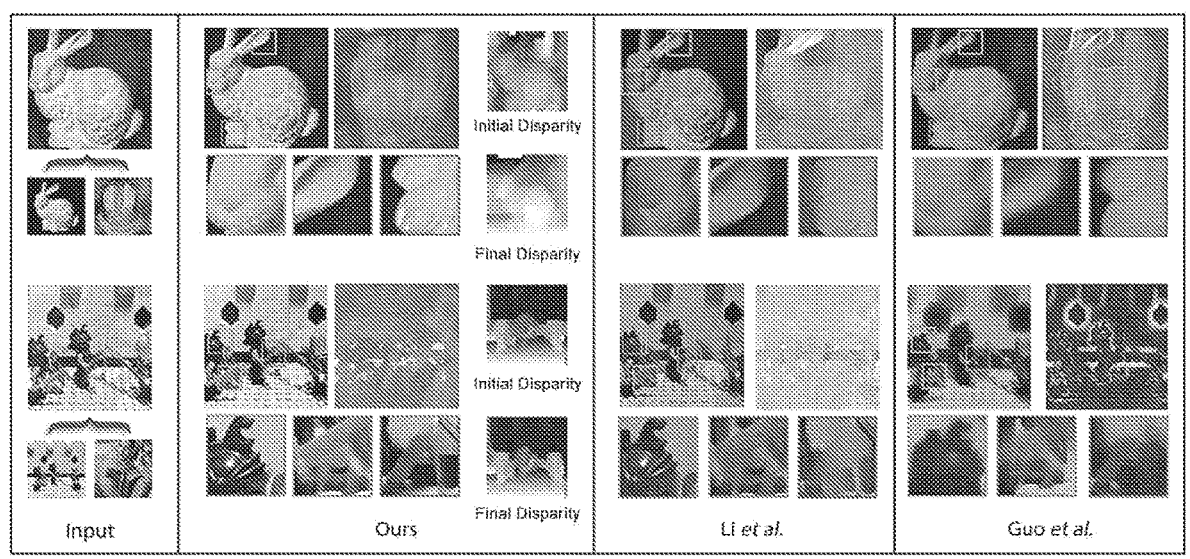
FIG. 4 shows the images of the transmitted layer and the secondary layer in accordance with yet another embodiment of the present invention and two prior art techniques.

FIG. 4 shows the images of the transmitted layer and the secondary layer in accordance with yet another embodiment of the present invention and two prior art techniques. Similar to our approach, Li et al. also models the transformation of the transmitted layers across different views as a flow field and employs SIFT-flow for image warping. Therefore, it is expected to better handle non-planar transmitted layer as shown in column 2 in FIG. 4. The main difference though is that in their technique the flow field is only computed once (in the beginning) and no longer updated, whereas we integrate flow/disparity estimation and layer separation into a joint optimization framework. Consequently, Li's separation quality heavily relies on flow initialization. For example, the bunny on the transmittance layer appears blurred in column 3 in FIG. 4 since the initial disparity estimation is erroneous. In contrast, our technique iteratively improves the layer separation and disparity estimation. The details of the bunny can now be correctly recovered 1 using our technique. In fact, the overall quality of layer separation using our technique is also significantly better as shown in FIG. 4.

3. Refocusing Results.

Figure 5:
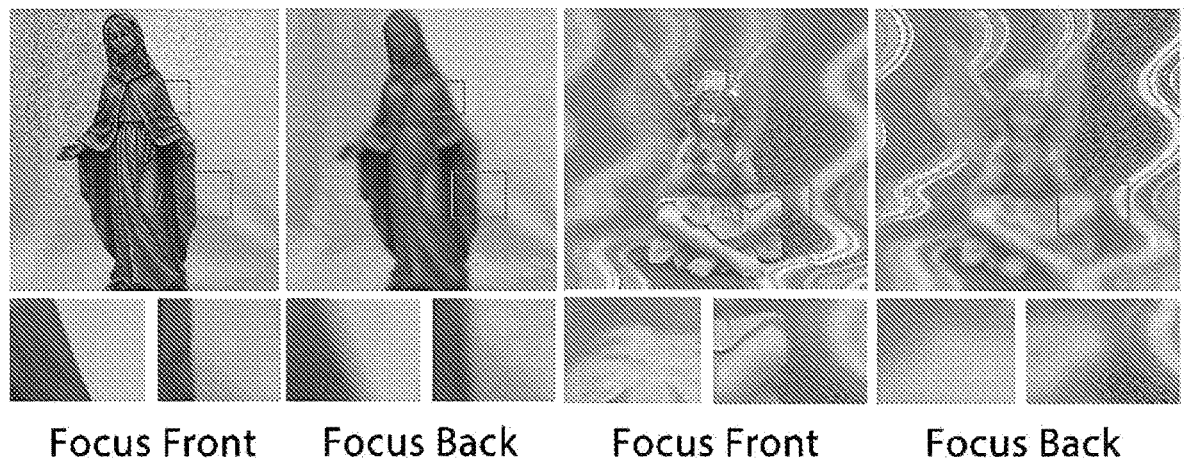
FIG. 5 shows the images of depth-guided refocusing of the transmitted layer in accordance with yet another embodiment of the present invention.

We demonstrate depth-guided refocusing by using the depth map and transmitted layer image recovered by our algorithm. FIG. 5 shows the images of depth-guided refocusing of the transmitted layer in accordance with yet another embodiment of the present invention. As shown in FIG. 5, the color and depth boundaries are well-aligned in the close-ups.

4. Dynamic Scenes.

Figure 6:
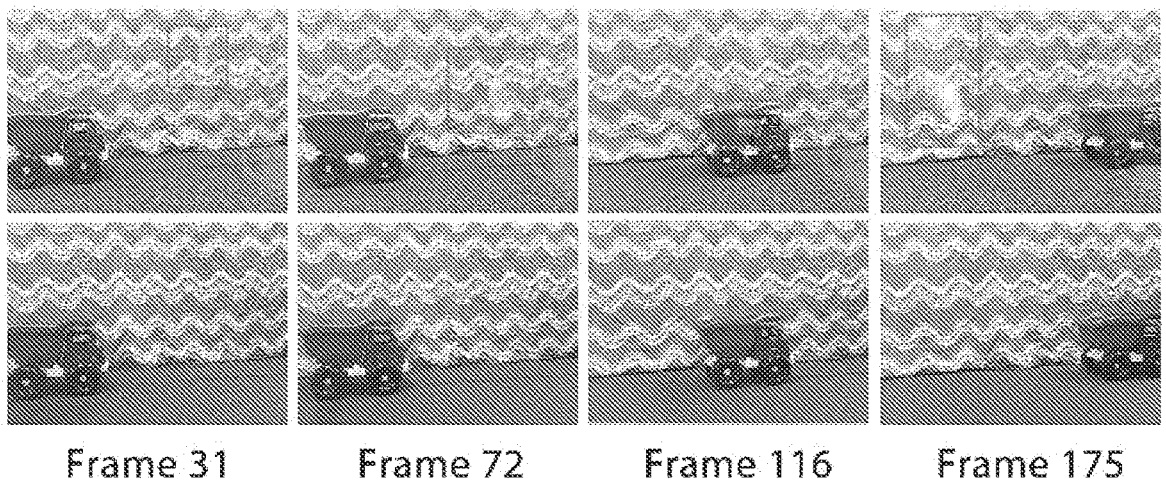
FIG. 6 shows the images of transmitted layer and reflected layer in dynamic scenes (i.e., video) accordance with yet another embodiment of the present invention.

Our method even works on dynamic scenes (i.e., video), which would be almost impossible for traditional methods using an unstructured collection of viewpoints. With the help of disparity map, we can easily distinguish between the transmitted layer and the reflected one. FIG. 6 shows the images of transmitted layer and reflected layer in dynamic scenes (i.e., video) in accordance with yet another embodiment of the present invention. With reference to FIG. 6, this action can be done with the following procedures.

i. Set the output frame as the reference frame (Frame ref.).
ii. Get the initial disparity map with the reference frame and the frames nearby through SIFT-Flow, similar to the static case.
iii. For Frame ref. and nearby, use Augmented Lagrange Multiplier (ALM) with Alternating Direction Minimizing (ADM) strategy to optimize the objective function. Adopt the alternating direction method to iteratively solve the subproblems.
iv. Once the solutions at each iteration are obtained, update the disparity estimation and warp the view to the center one by using the new disparity. Compare the Frame ref. disparity map with the nearby ones and label the parts with the same disparity to be excluded from the next iteration. This method is used to reduce the processing time.
v. Repeat iii. and iv. until the change of the objective function between two consecutive iterations is very small, such as below 0.1.
vi. Separate the transmitted layer and secondary layer by using the final disparity.

The invention claimed is:

1. A method of processing light field images, comprising:
capturing a plurality of views at a plurality of viewpoints with different polarization angles;
obtaining an initial disparity estimation for a first view using SIFT-flow, and warping the first view to a reference view;
optimizing an objective function comprising a transmitted layer and a secondary layer using an Augmented Lagrange Multiplier (ALM) with Alternating Direction Minimizing (ADM) strategy;
updating the disparity estimation for the first view;
repeating the steps of optimizing the objective function and updating the disparity estimation until the change in the objective function between two consecutive iterations is below a threshold; and
separating the transmitted layer from the secondary layer using updated disparity estimation for the first view.

2. The method of claim 1, wherein the transmitted layer is of low rank.

3. The method of claim 1, wherein the secondary layer is sparse.

4. The method of claim 1, wherein the transmitted layer and the secondary layer are independent.

5. The method of claim 4, wherein gradients of the transmitted layer and the secondary layer are sparse.

6. The method of claim 5, further comprising calculating a perfect polarization angle for the reference view.

7. The method of claim 6, further comprising setting the perfect polarization angle as the polarization angle for the reference view.

8. The method of claim 1, wherein the plurality of views are part of a light field video.

* * * * *